United States Patent [19]

Besic

[11] Patent Number: 4,729,249
[45] Date of Patent: Mar. 8, 1988

[54] RECIPROCATING PLUNGER PUMP HAVING SEPARATE AND INDIVIDUALLY REMOVABLE CROSSHEAD CRADLES

[75] Inventor: Dragan Besic, West Caldwell, N.J.

[73] Assignee: Dresser Industries, Inc., Dallas, Tex.

[21] Appl. No.: 899,702

[22] Filed: Aug. 25, 1986

[51] Int. Cl.$^4$ .................. F16H 21/22; F16C 5/00
[52] U.S. Cl. ........................... 74/44; 92/165 R; 384/11
[58] Field of Search ............ 74/44; 92/165 R; 123/74 AC; 184/5; 384/11

[56] References Cited

U.S. PATENT DOCUMENTS

| | | | |
|---|---|---|---|
| 284,768 | 9/1883 | Smith | 184/5 |
| 885,132 | 4/1908 | Ball | 384/11 |
| 1,143,649 | 6/1915 | Sandbo | 123/74 AC |
| 1,200,214 | 10/1916 | Minert | 74/44 |
| 1,651,330 | 11/1927 | Holmes | 74/44 |
| 1,891,973 | 12/1932 | Ellis | 184/5 X |
| 2,682,433 | 6/1954 | Maier | 384/11 |
| 4,486,005 | 12/1984 | Yaindl | 254/29 A |

OTHER PUBLICATIONS

Worthington Vertical Plunger Pumps Brochure #3200–B2 784 TP, printed in the U.S.A. by Worthington Pump Corporation, Harrison, N.J. 07029.

Primary Examiner—Allan D. Herrmann
Attorney, Agent, or Firm—Richards, Harris, Medlock & Andrews

[57] ABSTRACT

A reciprocating plunger pump is provided with a power section frame having open sides and vertical load-bearing walls spaced apart along the length of the frame. Separate, individually removable cradles are mounted on both sides of the frame directly to and extending between pairs of vertical walls. The cradles provide guides for linear reciprocating motion of main crossheads, which are attached to connecting rods driven by a rotating crankshaft. The cradles and the vertical walls are load-bearing so that the crankshaft may be rotated in either direction. The individually removable cradles provide easy access to both sides of the power section of the pump for inspection and maintenance of the power section components.

13 Claims, 3 Drawing Figures

RECIPROCATING PLUNGER PUMP HAVING SEPARATE AND INDIVIDUALLY REMOVABLE CROSSHEAD CRADLES

TECHNICAL FIELD

This invention relates to the power section of reciprocating plunger pumps and, in particular, to a power section having separate and individually removable cradles for guiding the reciprocating motion of the main crossheads.

BACKGROUND OF THE INVENTION

Large vertical reciprocating plunger pumps, such as the pump illustrated in FIG. 1 of U.S. Pat. No. 4,486,005 to Yaindl, normally have an upper pump section and a lower power section. The upper pump section includes a plunger connected to an upper crosshead, which is driven by side rods connected to a main crosshead in the power section. The power section of the pump includes a crankshaft mounted in a frame. One or more main crossheads are connected to the crankshaft by a corresponding number of connecting rods. The main crossheads are disposed between cradles in the frame which guide and confine the crossheads to linear reciprocating motion as the crankshaft is rotated about its drive axis.

The power section of conventional reciprocating plunger pumps is contained within and supported by a large box-like frame having side and end walls that carry both the primary vertical loads and the secondary lateral loads generated by the pump. The main crossheads are guided by cradles located on both side walls of the frame. The cradles on one side of the frame form an integral part of the frame side wall. These cradles, which are not removable from the frame, carry the secondary lateral loads generated by the pump. For maintenance purposes, the opposite side wall of the frame comprises a removable cradle panel. However, the removable cradle panel cannot bear the secondary lateral loads of the pump. Thus, the conventional reciprocating plunger pump can be operated only with the crankshaft rotating in one direction, i.e. toward the load-bearing cradle.

In addition to the unidirectional operating constraint of prior pumps, the conventional reciprocating plunger pump has other undesirable characteristics. For example, uniform casting of the large box-like frame is difficult because of the "closed" nature of the casting mold structure required. In addition, the overall length of a frame having integral cradles is necessarily greater than actually required. This is because the center-to-center distance of the integral cradles is dictated by manufacturing constraints such as boring tool swing clearances. This in turn requires a longer crankshaft with greater than desired distances between the main bearings, causing unwanted stress and wear to the power section components. Furthermore, because only the cradle panel on one side of the frame is removable, inspection and maintenance of the wear components of the power section are very difficult and time consuming.

Thus, it can be seen that there exists a need for an improved power section for large reciprocating plunger pumps, especially pumps having a multiplicity of plungers and main crossheads. In particular, a need exists for a large reciprocating pump frame which can be cast easily and accurately, which provides for individually removable crosshead guide cradles for ease of maintenance, and which allows the power crankshaft to be driven in either direction about its drive axis.

SUMMARY OF THE INVENTION

The present invention is a new construction for the power section of reciprocating plunger pumps. The power section of the present invention includes a frame having open sides and vertical load-bearing walls spaced apart along the length of the frame. Fabrication of this "open" frame is greatly improved because of the better positioning and support obtainable for the mold cores used during casting. This results in high quality castings with uniform wall thicknesses and accurate dimensions.

The present invention includes a crankshaft, one or more main crossheads, and a corresponding number of connecting rods for connecting the crossheads to the crankshaft. However, the new construction of the power section frame allows the use of separate, individually removable cradles for both sides of each main crosshead. Each individual cradle extends between and is mounted directly to a pair of vertical walls at the side of the frame. Because the vertical walls bear the primary vertical loads as well as a portion of the secondary lateral loads generated by the pump, and because the individual cradles span only the short distance between each pair of vertical walls, the cradles on both sides of the frame are able to bear the remaining portion of the lateral loads of the pump. Thus, the crankshaft of the pump may be operated in either direction because load-bearing cradles are mounted on both sides of the frame.

The separate, individually removable cradles of the present invention are especially beneficial during maintenance or replacement of the wear components of the power section. The individually removable cradles permit access through either or both sides of the frame, and the large, open side areas of the frame allow unimpeded access to all the power section components of the pump.

Furthermore, the overall length of the pump is reduced by using separate, individually removable cradles for the crossheads. Although the frame of the present invention has vertical interior walls separating the main crossheads, the center-to-center distance between adjacent cradles can be reduced because cradle spacing is not dictated by boring tool swing clearances as in prior frame constructions. Thus, the length of the crankshaft and the spacing between the main bearings can be reduced to lower stress and wear on the power section components of the pump.

BRIEF DESCRIPTION OF THE DRAWINGS

For a more complete understanding of the present invention and for further advantages thereof, reference is made to the following Description of the Preferred Embodiment taken in conjunction with the accompanying Drawings, in which.

DESCRIPTION OF THE PREFERRED EMBODIMENT

Figure 1:
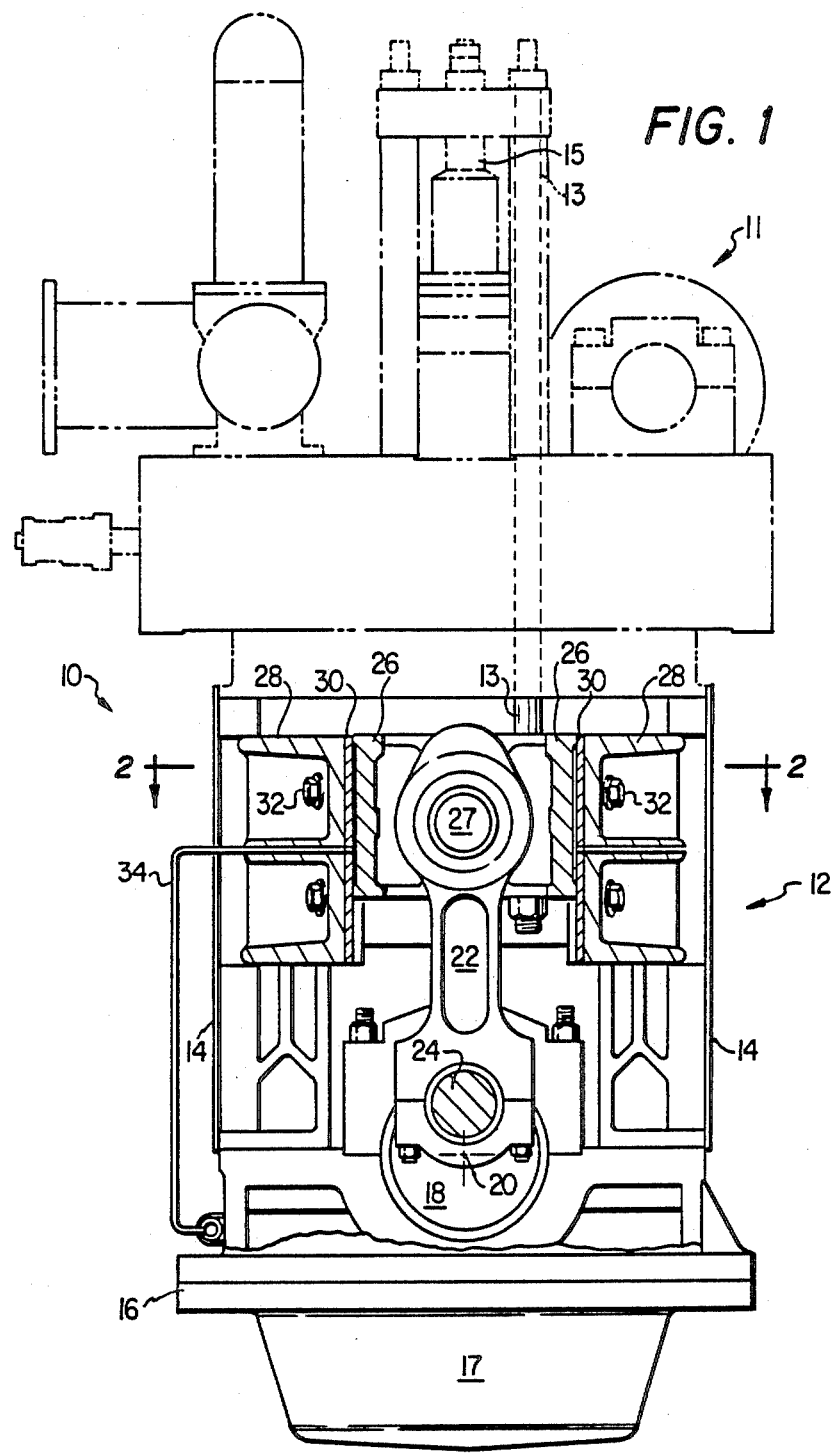
FIG. 1 is a cut-away cross-sectional view of one end of the power section of the present invention with a silhouette of the upper pump section illustrated in phantom.

Referring to the FIGURES, wherein like reference numerals indicate corresponding parts, FIG. 1 is a cutaway view of one end of a reciprocating plunger pump 10 of the present invention. Pump 10 comprises a pump section 11, which is illustrated in phantom, and a power section 12. An isometric drawing of a reciprocating plunger pump of conventional design is illustrated in FIG. 1 of U.S. Pat. No. 4,486,005 to Yaindl. The pump section 11 of such a plunger pump includes side rods 13 which transmit reciprocating motion to plunger 15.

The present invention relates to the construction of the power section 12 of reciprocating plunger pump 10. Power section 12 includes a frame 14 which is mounted on a base 16. Base 16 may include an oil pan 17 containing lubricating oil.

A crankshaft 18 is mounted in frame 14. Crankshaft 18 is rotatable about a drive axis 20, which extends perpendicularly from the plane of FIG. 1. A connecting rod 22 is attached to crankshaft 18 by a pin 24 offset from the drive axis 20. A crosshead 26 is pivotally mounted by a pin 27 to the end of connecting rod 22 remote from crankshaft 18. Connecting rod 22 converts the rotational motion of crankshaft 18 about drive axis 20 into linear reciprocating motion of crosshead 26. Side rods 13 are attached to crosshead 26 to transfer the linear reciprocating motion of crosshead 26 to plunger 15.

Reciprocating plunger pump 10 may comprise a plurality of crossheads 26 attached to crankshaft 18 by means of a corresponding plurality of connecting rods 22. The plurality of crossheads 26 drive a corresponding plurality of side rods 13 and plungers 15 in pump section 11.

Crosshead 26 is guided and confined to linear reciprocating motion by a pair of cradles 28. Each cradle 28 is individually and removably mounted to frame 14. Each crosshead 26 of pump 10 utilizes two separate cradles 28 mounted on opposite sides of frame 14. Cradles 28 include wear surfaces 30 attached by bolts 32. An oil line 34 connected to each cradle 28 transports lubricating oil to the area of contact between crosshead 26 and the wear surface 30 of cradle 28.

Figure 3:
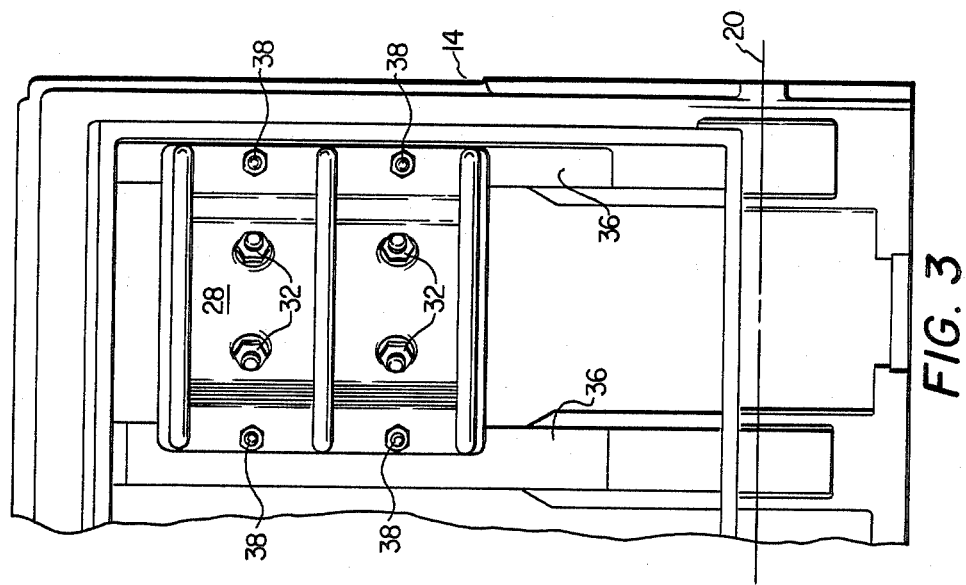
FIG. 3 is a side view of a portion of the present invention.
Figure 2:
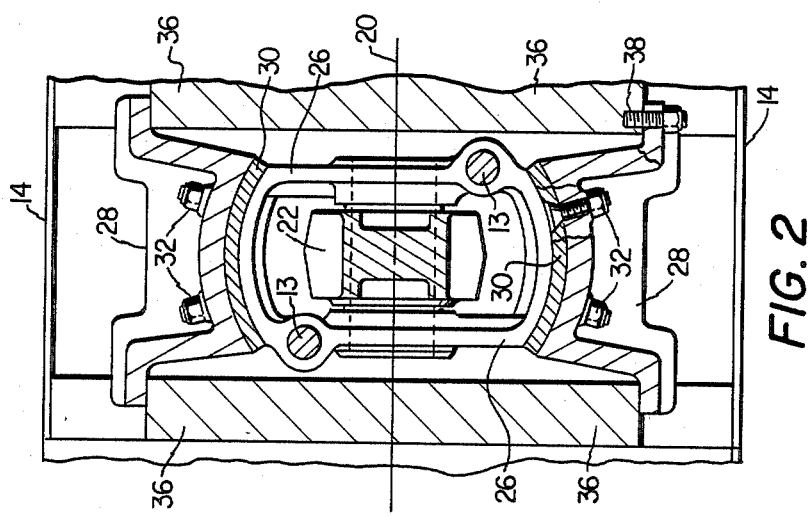
FIG. 2 is a top sectional view of a portion of the present invention taken along section line 2—2 of FIG. 1.

Referring to FIGS. 2 and 3, FIG. 2 is a cross-section of a portion of the present invention taken along section line 2—2 of FIG. 1, and FIG. 3 is a side view of a portion of the present invention showing a cradle 28 mounted on vertical walls 36. FIG. 2 illustrates one crosshead 26 of the present invention, which may comprise a plurality of similar crossheads 26. Crosshead 26 is connected by means of connecting rod 22 to crankshaft 18 which is rotatable about drive axis 20. Crosshead 26 is confined to reciprocating linear motion in a direction perpendicular to the plane of FIG. 2. The motion of crosshead 26 is guided by a pair of cradles 28 having wear surfaces 30 attached by bolts 32 to cradles 28.

As shown in FIGS. 2 and 3, frame 14 of the present invention includes a plurality of load-bearing vertical walls 36 spaced apart along the length of frame 14. Each separate cradle 28 is removably attached to a pair of vertical walls 36 by bolts 38. Cradles 28 span the distance between vertical walls 36 on each side of frame 14. Vertical walls 36 of frame 14 bear the vertical loads generated by pump 10 as well as a portion of the lateral loads. Cradles 28, which are individually attached to vertical walls 36, bear the remaining portion of the lateral loads of the pump 10. This load-bearing structure allows crankshaft 18 (shown in FIG. 1) to be driven in either direction about drive axis 20. In addition, cradles 28 are individually removable from frame 14 to replace wear surfaces 30 and to provide access for inspection or replacement of the other components of power section 12 of pump 10.

Although the present invention has been described with respect to a specific embodiment thereof, various changes and modifications to this embodiment may be suggested to one skilled in the art, and it is intended that the present invention encompass such changes and modifications as fall within the scope of the appended claims.

I claim:

1. A reciprocating plunger pump, comprising:
a frame having two open sides;
a crankshaft mounted in said frame for rotation about a drive axis extending parallel to the sides of said frame;
a connecting rod having a first end attached to said crankshaft at a point offset from said drive axis;
a crosshead pivotally mounted on a second end of said connecting rod; and
a pair of cradles comprising crosshead guides individually and removably mounted opposite each other on said frame for covering respective sides of said frame and for confining said crosshead to linear reciprocating motion between said guides as said crankshaft is rotated about said drive axis.

2. The reciprocating plunger pump of claim 1, wherein said frame comprises:
a base; and
a plurality of spaced-apart, load-bearing vertical walls mounted on said base perpendicular to said drive axis.

3. The reciprocating plunger pump of claim 2, wherein said crosshead and said connecting rod are disposed between a pair of said vertical walls.

4. The reciprocating plunger pump of claim 3, further comprising a plurality of cradle pairs, wherein each of said cradles extends between and is removably mounted to a pair of said vertical walls.

5. The reciprocating plunger pump of claim 1, wherein said crosshead guides comprise:
wear surfaces mounted on said cradles for engaging and guiding said crosshead; and
means for removably mounting said wear surfaces on said cradles.

6. A reciprocating plunger pump, comprising:
a frame having open sides, said frame comprising a base and a plurality of load-bearing vertical walls mounted on said base, said vertical walls spaced-apart perpendicular to the sides of said frame;
a crankshaft mounted in said frame for rotation about a drive axis extending parallel to the sides of said frame;
at least one connecting rod having a first end attached to said crankshaft at a point offset from said drive axis;
at least one crosshead mounted on a second end of said connecting rod; and
a plurality of cradles, wherein each of said cradles extends between and is removably mounted on a pair of said vertical walls for covering the sides of said frame and for confining said crosshead to linear reciprocating motion as said crankshaft is rotated about said axis.

7. The reciprocating plunger pump of claim 6, wherein said crosshead and connecting rod are disposed between a pair of said vertical walls.

8. The reciprocating plunger pump of claim 6, wherein removal of said cradles opens the sides of said frame for access to the pump for maintenance and repair.

9. The reciprocating plunger pump of claim 6, wherein said cradles include wear surfaces removably mounted thereon for engaging and guiding said crosshead.

10. A reciprocating plunger pump, comprising:
a frame having two open sides;
a crankshaft mounted in said frame for rotation about a drive axis extending parallel to the sides of said frame;
at least one crosshead connected to said crankshaft by means of a connecting rod;
said crosshead having a pair of cradles for guiding and confining said crosshead to linear reciprocating motion between said cradles as said crankshaft is rotated about said drive axis; and
means for removably mounting each of said cradles on said frame for covering the sides of said frame, wherein removal of said cradles opens the sides of said frame for access to the pump for maintenance and repair.

11. The reciprocating plunger pump of claim 10, wherein said frame includes a base and a plurality of spaced-apart load-bearing vertical walls mounted on said base perpendicular to the sides of said frame.

12. The reciprocating plunger pump of claim 11, wherein each of said cradles is removably mounted on and extends between a pair of said vertical walls.

13. The reciprocating plunger pump of claim 12, wherein said cradles mounted on said vertical walls provide load-bearing structure for rotation of said crankshaft in either direction.

* * * * *